United States Patent
Kim et al.

(10) Patent No.: US 8,159,566 B2
(45) Date of Patent: Apr. 17, 2012

(54) METHOD AND APPARATUS FOR COMPENSATING SIGNAL DISTORTION CAUSED BY NOISE

(75) Inventors: Il-do Kim, Seoul (KR); Jae-sung Jun, Seoul (KR); Byung-sun Choi, Gunpo-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 654 days.

(21) Appl. No.: 12/026,561

(22) Filed: Feb. 6, 2008

(65) Prior Publication Data

US 2009/0015698 A1 Jan. 15, 2009

(30) Foreign Application Priority Data

Jul. 9, 2007 (KR) .................. 10-2007-0068800

(51) Int. Cl.
*H04N 5/217* (2011.01)
*H04N 5/235* (2006.01)

(52) U.S. Cl. ...................... 348/241; 348/362

(58) Field of Classification Search .................. 348/241, 348/243, 248, 229.1, 362
See application file for complete search history.

(56) References Cited

U.S. PATENT DOCUMENTS

| 6,681,058 B1 * | 1/2004 | Hanna et al. ............... 382/294 |
| 7,778,484 B2 * | 8/2010 | Fu ............................... 382/275 |
| 2007/0053557 A1 * | 3/2007 | Cahill et al. ............... 382/128 |

* cited by examiner

*Primary Examiner* — Trung Diep
(74) *Attorney, Agent, or Firm* — Sughrue Mion, PLLC

(57) ABSTRACT

Provided are an apparatus and a method for compensating signal distortion caused by noise. The apparatus comprises a noise reduction unit which reduces noise of an input signal including non-zero mean random noise, and a signal compensator which compensates the output signal of the noise reduction unit so that a signal distortion due to the non-zero mean random noise is removed from the output signal of the noise reduction unit.

15 Claims, 6 Drawing Sheets

METHOD AND APPARATUS FOR COMPENSATING SIGNAL DISTORTION CAUSED BY NOISE

CROSS-REFERENCE TO RELATED PATENT APPLICATION

This application claims priority from Korean Patent Application No. 10-2007-0068800, filed on Jul. 9, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to compensating signal distortion caused by noise and, more particularly, to compensating signal distortion caused by non-zero mean random noise of an imaging device to improve picture quality.

2. Description of the Related Art

Imaging devices convert light into an electric signal corresponding to an image, and include complementary metal oxide semiconductor (CMOS) imaging devices and charge coupled device (CCD) imaging devices. An imaging device is required to generate an electric signal ideally proportional to the illuminance of light input thereto; however, various noise is added when the light is converted into the electric signal. This noise includes dark current noise, kTC noise, fixed pattern noise, etc.

Dark current noise is thermal noise proportional to temperature and deteriorates the picture quality of an image when the image is obtained with a low illuminance. kTC noise is generated according to various switching pulse signals used to drive a CMOS camera or a CCD camera. Fixed pattern noise is generated when a CMOS imaging device or a CCD imaging device includes a defect pixel. The fixed pattern noise is caused by non-uniformity generated due to various causes in a CMOS manufacturing process or a CCD manufacturing process and appears as white spot defect, black spot defect, line defect, banded spot defect and sensitive speck. The aforementioned noise is added to charges photo-electric-converted by an imaging device and accumulated to deteriorate picture quality.

FIG. 7 is a graph for explaining noise generated according to illuminance of light input to an imaging device. Referring to FIG. 7, a small dynamic range and a relatively high noise level compared to the magnitude of a signal at a low illuminance become problems in the imaging device. When the illuminance of light input to the imaging device is high, that is, when an image-capturing environment is bright, noise generated in the imaging device is considerably smaller than the quantity of charges photo-electric-converted by the imaging device and accumulated, and thus picture quality is not largely deteriorated. However, when the image-capturing environment is dark, noise such as fixed pattern noise, dark current noise and kTC noise become relatively larger compared to the quantity of charges photo-electric-converted by the imaging device and accumulated, and thus picture quality is severely deteriorated.

SUMMARY OF THE INVENTION

The present invention provides an apparatus and a method for compensating signal distortion caused by noise, which compensate for boost-up of a low illuminance signal and drag-down of a high illuminance signal, which are caused by non-zero mean random noise, to improve picture quality.

According to an aspect of the present invention, there is provided an apparatus for compensating signal distortion caused by noise, the apparatus comprising: a noise reduction unit reducing noise of an input signal comprising zero mean random noise and non-zero mean random noise; and a signal compensator compensating an output signal of the noise reduction unit such that a signal distortion due to the non-zero mean random noise is removed from the output signal of the noise reduction unit.

The noise reduction unit may reduce the noise of the input signal in a spatial domain or a temporal domain.

The input signal of the noise reduction unit may correspond to an output signal of an imaging device comprising a CMOS image sensor or a CCD image sensor.

The signal compensator may be activated when the illuminance of light input to the imaging device is lower than a predetermined first threshold.

The first threshold may correspond to illuminance when the magnitude of the output signal of the noise reduction unit equals the standard deviation of the zero mean random noise.

The signal compensator may be activated when the illuminance of light input to the imaging device is higher than a predetermined second threshold.

The second threshold may correspond to illuminance when the magnitude of the output signal of the noise reduction unit equals a value obtained by subtracting the standard deviation of the zero mean random noise from a maximum signal magnitude.

The signal compensator may output a value obtained by subtracting a value, which is obtained by dividing the magnitude of the output signal of the noise reduction unit at the first threshold by 2, from the magnitude of the output signal of the noise reduction unit, and then multiplying the subtraction result by 2 when the illuminance corresponding to the output signal of the noise reduction unit is lower than the first threshold.

The signal compensator may output a value obtained by subtracting the magnitude of the output signal of the noise reduction unit at the second threshold from a value obtained by multiplying the magnitude of the output signal of the noise reduction unit by 2 when the illuminance corresponding to the output signal of the noise reduction unit is higher than the second threshold.

The signal compensator may output the output signal of the noise reduction unit without compensating the output signal of the noise reduction unit when the illuminance corresponding to the output signal of the noise reduction unit is higher than the first threshold.

The signal compensator may output the output signal of the noise reduction unit without compensating the output signal of the noise reduction unit when the illuminance corresponding to the output signal of the noise reduction unit is lower than the second threshold.

The apparatus may further comprise a noise variance calculator calculating the variance of the zero mean random noise of the input signal and providing the variance to the signal compensator.

According to another aspect of the present invention, there is provided a method of compensating signal distortion caused by noise, the method comprising: reducing noise of an input signal comprising non-zero mean random noise; and compensating the noise-reduced input signal such that a signal distortion due to the non-zero mean random noise is removed from the noise-reduced signal.

According to another aspect of the present invention, there is provided a computer readable recording medium storing a program for executing a method for compensating signal distortion caused by a noise, the method comprising: reducing noise of an input signal comprising non-zero mean random noise; and compensating the noise-reduced input signal such that a signal distortion due to the non-zero mean random noise is removed from the noise-reduced signal.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
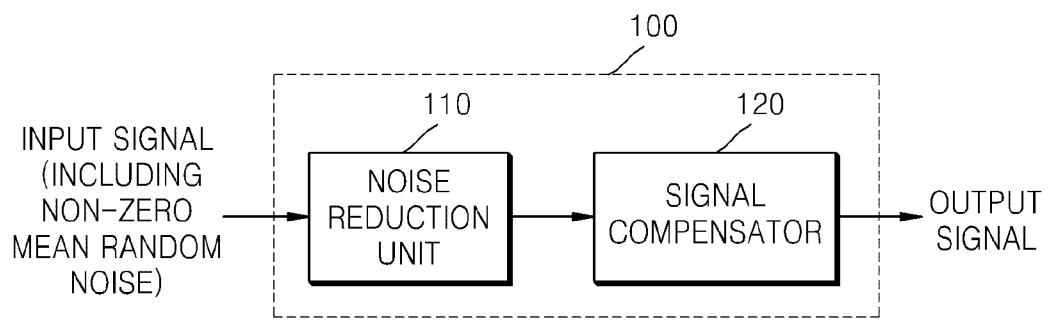
FIG. 1 is a block diagram of an apparatus for compensating signal distortion caused by noise, according to an exemplary embodiment of the present invention.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Throughout the drawings, like reference numerals refer to like elements.

FIG. 1 is a block diagram of an apparatus 100 for compensating signal distortion caused by noise, according to an exemplary embodiment of the present invention. Referring to FIG. 1, the apparatus 100 for compensating signal distortion caused by noise according to the current exemplary embodiment of the present invention includes a noise reduction unit 110 and a signal compensator 120. An input signal of the noise reduction unit 110 may include non-zero mean random noise. For example, a CMOS imaging device or a CCD imaging device cannot output a signal having a magnitude lower than 0V and higher than a predetermined maximum signal magnitude. Accordingly, an output signal of the CMOS imaging device or CCD imaging device having a magnitude similar to 0V or the maximum signal magnitude may also include non-zero mean random noise. This will be explained later with reference to FIGS. 3A through 3F.

The noise reduction unit 110 reduces noise included in the input signal. Here, the noise reduction unit 110 assumes that the noise included in the input signal is white noise with no correlation with the noiseless input signal and zero mean random noise.

The noise reduction unit 110 reduces the noise included in the input signal to improve a signal-to-noise ratio (SNR) of the input signal. The noise reduction unit 110 can perform two-dimensional noise reduction which reduces noise in a spatial domain or three-dimensional noise reduction which reduces noise in the spatial domain and then decreases the noise in a temporal domain.

However, non-zero mean random noise remains in the output signal of the noise reduction unit 110 and signal distortion caused by the non-zero mean random noise exists in the output signal of the noise reduction unit 110 because of the non-zero mean random noise included in the input signal.

The signal compensator 120 compensates the output signal of the noise reduction unit 110 such that a signal distortion due to the non-zero mean random noise is removed from the output signal of the noise reduction unit 110. When it is assumed that the input signal of the noise reduction unit 110 includes non-zero mean random noise at low illuminance or high illuminance and the input signal includes only a zero mean random noise at a medium illuminance, the output signal of the noise reduction unit 110 includes signal distortion caused by the non-zero mean random noise at the low illuminance or high illuminance even though the output signal does not include signal distortion at the medium illuminance. Accordingly, the signal compensator 120 can estimate the waveform of a noise-free output signal at the low illuminance or high illuminance in consideration of the waveform of the output signal of the noise reduction unit 110 at the medium illuminance. The signal compensator 120 compensates the output signal of the noise reduction unit 110 such that the output signal has the waveform of the noise-free output signal.

Furthermore, the signal compensator 120 can compensate the output signal of the noise reduction unit 110 using the magnitude of the output signal of the noise reduction unit 110 at a predetermined illuminance. This will be explained later with reference to FIGS. 3A through 3F.

Figure 2:
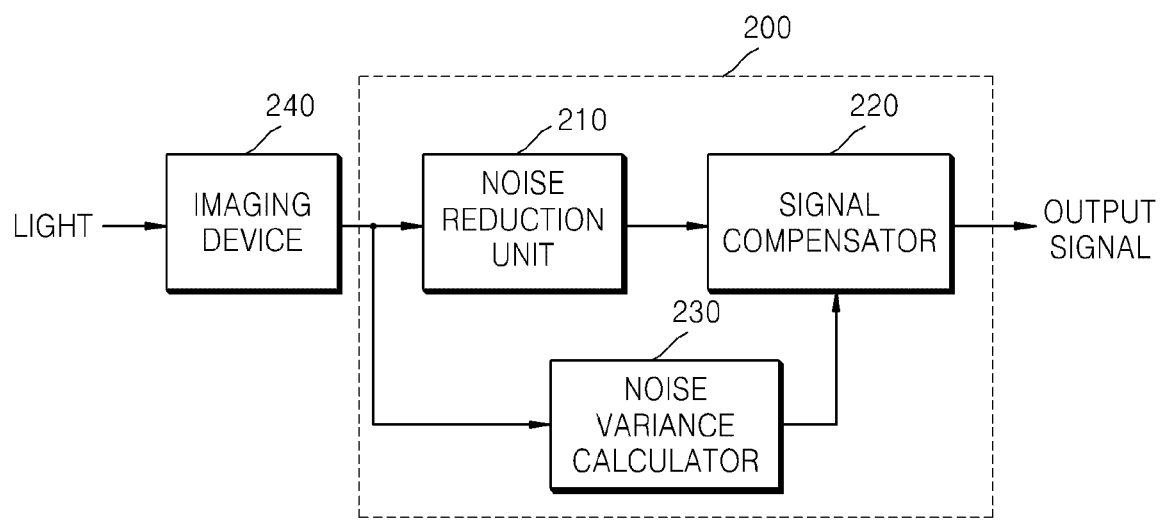
FIG. 2 is a block diagram of an apparatus for compensating signal distortion caused by noise, according to another exemplary embodiment of the present invention.

FIG. 2 is a block diagram of an apparatus 200 for compensating signal distortion caused by noise, according to another exemplary embodiment of the present invention. Referring to FIG. 2, the apparatus 200 for compensating signal distortion caused by noise according to the current exemplary embodiment of the present invention includes a noise reduction unit 210, a signal compensator 220, and a noise variance calculator 230.

An input signal of the noise reduction unit 210 corresponds to an output signal of an imaging device 240 such as a CMOS image sensor or a CCD image sensor. The output signal of the imaging device 240 cannot have a magnitude lower than 0V or higher than a predetermined maximum signal magnitude, and thus the input signal of the noise reduction unit 210 also cannot have a magnitude lower than 0V or higher than the maximum signal magnitude.

It is assumed that the original (noise-free) output signal of the imaging device 240 has a magnitude similar to 0V or the maximum signal magnitude. When the original output signal of the imaging device 240 includes noise, the output signal of the imaging device 240 can have a magnitude lower than 0V or higher than the maximum signal magnitude ideally. However, in practical terms, the output signal of the imaging device 240 cannot have a magnitude lower than 0V or higher than the maximum signal magnitude, and a signal having a magnitude lower than 0V or higher than the maximum signal magnitude is clipped, and thus the output signal of the imaging device 240 has a magnitude corresponding to 0V or the maximum signal magnitude. Accordingly, the output signal of the imaging device 240 includes non-zero mean random noise. The output signal of the imaging device 240 also includes white noise and zero mean random noise.

The noise reduction unit 210 reduces noise included in the input signal of the noise reduction unit 210. Here, the noise reduction unit 210 assumes that the white noise of the input signal has no correlation with the input signal.

The signal compensator 220 compensates an output signal of the noise reduction unit 210 such that the zero mean random noise is removed from the input signal. To compensate the output signal of the noise reduction unit 210, the variance (or the standard deviation) of the zero mean random noise included in the input signal of the noise reduction unit 210 may be required. This will be explained later in detail.

The noise variance calculator 230 calculates the variance of the zero mean random noise included in the input signal of the noise reduction unit 210 and provides the variance to the signal compensator 220. The noise variance calculator 230 can be used when the variance of the zero mean random noise included in the input signal of the noise reduction unit 210 is not known. It may be preferable that the variance of the zero mean random noise is calculated. For example, when the output signal of the imaging device 240 includes non-zero mean random noise at low illuminance and high illuminance and includes zero mean random noise at medium illuminance, the variance of the zero mean random noise at the medium illuminance is obtained. The variance calculated by the noise variance calculator 230 can be used to determine the range of illuminance (for example, the boundary of the low illuminance, the medium illuminance and the high illuminance) compensated by the signal compensator 220.

Figure 3A:
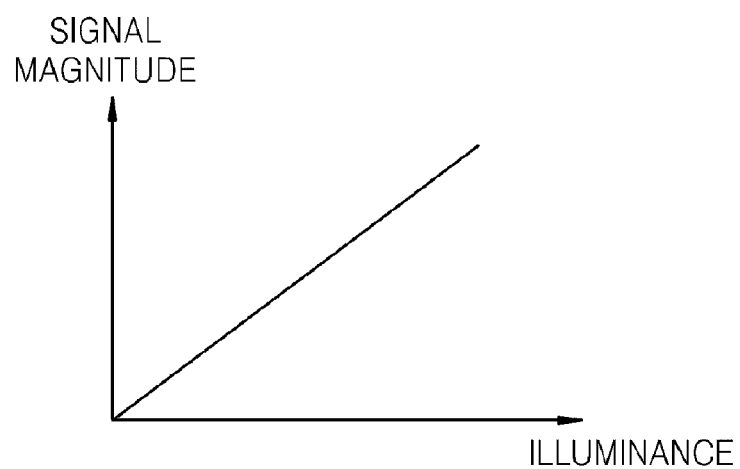
FIGS. 3A through 3F are graphs for explaining a process of compensating signal distortion, according to exemplary embodiments of the present invention.

FIGS. 3A, 3B, 3C and 3D are graphs for explaining a process of compensating signal distortion, according to exemplary embodiments of the present invention. FIG. 3A is a graph illustrating the magnitude of an output signal of an imaging device according to illuminance when zero mean random noise is not added to a noise-free signal of the imaging device. That is, as the illuminance increases, the magnitude of the output signal of the imaging device also increases.

Figure 3B:
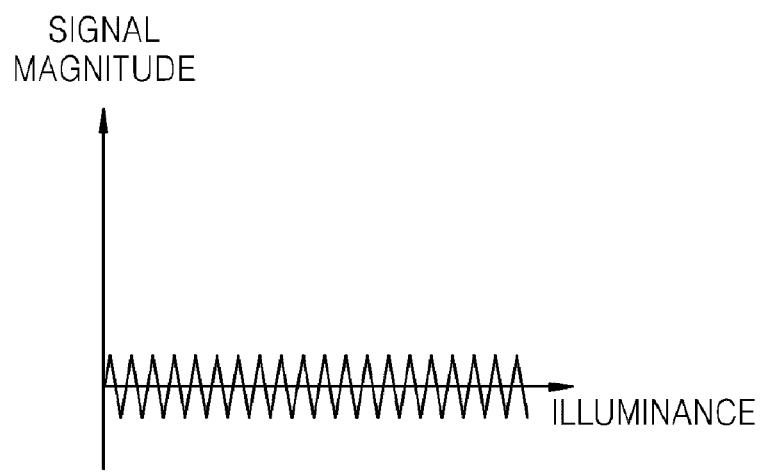

FIG. 3B is a graph illustrating zero mean random noise. Referring to FIG. 3B, the zero mean random noise has a mean value of zero and is randomly distributed. The zero mean random noise is assumed to be white noise having no correlation with the output signal of the imaging device.

Figure 3C:
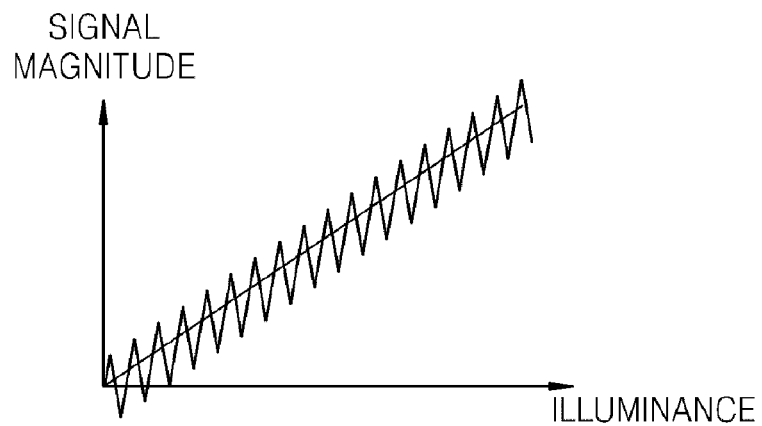

FIG. 3C is a graph illustrating the sum of the noise-free output signal of the imaging device, illustrated in FIG. 3A, and the zero mean random noise illustrated in FIG. 3B. That is, a signal having a magnitude lower than 0V or higher than the maximum signal magnitude can be output mathematically at low illuminance or high illuminance.

Figure 3D:
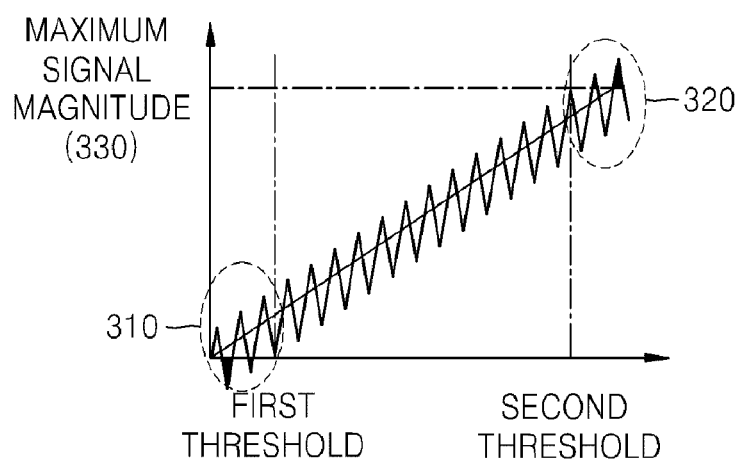

FIG. 3D is a graph illustrating that a zero mean random noise is distorted and changed into a non-zero mean random noise at the low illuminance or high illuminance when the zero mean random noise is added to the output signal of the imaging device. Referring to FIG. 3D, when illuminance is lower than a first threshold, the zero mean random noise is changed into the non-zero mean random noise. Preferably, the first threshold corresponds to illuminance 310 (that is, a low illuminance) when the standard deviation of noise equals to the noise-free output signal of the imaging device. A second threshold corresponds to illuminance 320 when the standard deviation of noise equates to the difference between a maximum signal magnitude 330 and the noise-free output signal of the imaging device.

When the illuminance is lower than the first threshold, that is, when the noise-free output signal of the imaging device is lower than the standard deviation of noise, positive noise is added to the output signal of the imaging device but negative noise is not added to the output signal of the imaging device. That is, noise having an absolute value greater than the magnitude of the noise-free output signal of the imaging device among the negative noise is clipped according to signal+noise=0. In this case, only a part of the negative noise is added to the output signal of the imaging device, and thus the noise added to the output signal has a positive mean value.

When the illuminance is higher than the second threshold, the negative noise is all added to the output signal of the imaging device but all the positive noise is not added to the output signal of the imaging device. That is, noise having an absolute value larger than the difference between the maximum signal magnitude and the noise-free output signal of the imaging device among the positive noise is clipped according to signal+noise=0. In this case, the negative noise is all added to the output signal of the imaging device and only a part of the positive noise is added to the output signal of the imaging device, and thus the noise added to the output signal of the imaging device has a negative mean value.

Furthermore, since noise is uniformly distributed in an image, the variance of the noise can be estimated as a mean variance of the region between the first threshold and the second threshold.

Figure 3E:
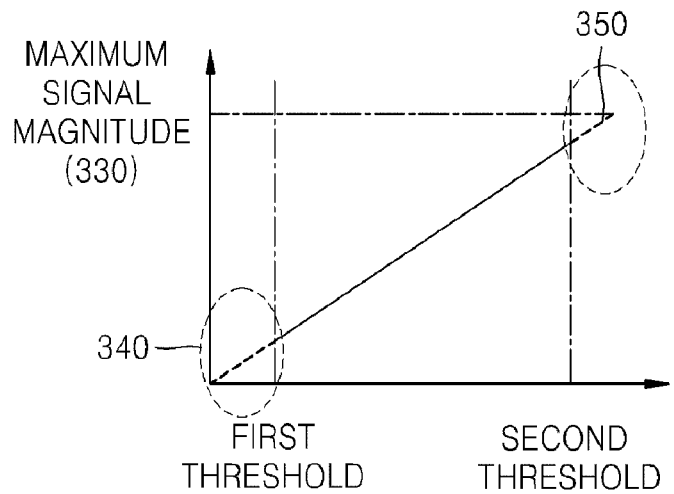
Figure 3F:
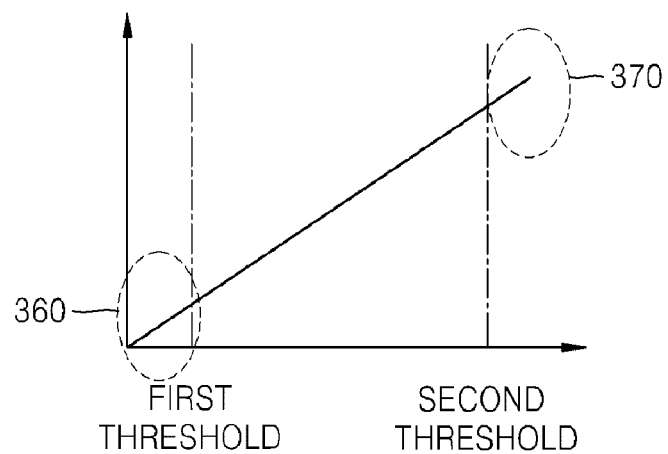

FIGS. 3E and 3F are graphs for explaining a process of compensating signal distortion caused by noise, according to exemplary embodiments of the present invention. FIG. 3E is a graph illustrating the magnitude of the output signal of the noise reduction unit 110 or 210 illustrated in FIGS. 1 and 2 according to illuminance of light input to the imaging device 240 in FIG. 2. Referring to FIG. 3E, the output signal of the noise reduction unit 110 or 210 is similar to the noise-free output signal of the imaging device in the region between the first threshold and the second threshold and signal distortion can be ignored. However, the output signal of the noise reduction unit 110 or 210 includes considerable signal distortion in regions lower than the first threshold and higher than the second threshold.

Accordingly, the signal compensator 120 or 220 can be activated only when the illuminance 340 of light input to the imaging device 240 is lower than the first threshold or when the illuminance 350 of light input to the imaging device is higher than the second threshold. When the illuminance corresponding to the output signal of the noise reduction unit 110 or 120 is higher than the first threshold or lower than the second threshold, the signal compensator 120 or 220 can output the output signal of the noise reduction unit 110 or 210 without compensating the output signal. When the illuminance corresponding to the output signal of the noise reduction unit 110 or 120 is higher than the first threshold or lower than the second threshold, clipped noise is relatively small in the region between the first threshold and the second threshold, and thus signal distortion is not large. Accordingly, it can be considered that only the zero mean random noise exists in the region between the first threshold and the second threshold.

It may be preferable that the first threshold corresponds to the illuminance when the magnitude of the output signal of the noise reduction unit 110 or 210 equates to the standard deviation of the zero mean random noise. The standard deviation of the zero mean random noise can be previously known to the signal compensator 220 or calculated by the noise variance calculator 230 and provided to the signal compensator 220. The zero mean random noise can be calculated from noise between the first threshold and the second threshold.

Furthermore, it is preferable that the second threshold corresponds to the illuminance when the magnitude of the output signal of the noise reduction unit 110 or 210 equates to the value obtained by subtracting the standard deviation of the zero mean random noise from the maximum signal magnitude 330.

When the illuminance corresponding to the output signal of the noise reduction unit 110 or 210 is lower than the first threshold, the signal compensator 120 or 220 can compensate for signal distortion by subtracting a value, which is obtained by dividing the magnitude of the output signal of the noise reduction unit 110 or 210 at the first threshold by 2, from the magnitude of the output signal of the noise reduction unit 110 or 210 and then multiplying the result by 2. That is, signal distortion can be compensated for according to the following equation.

(Output signal of signal compensator)=[(output signal of noise reduction unit)−(output signal of noise reduction unit at first threshold)/2]*2

Furthermore, when the illuminance corresponding to the output signal of the noise reduction unit 110 or 210 is higher than the second threshold, the signal compensator 120 or 220 can compensate for signal distortion by subtracting the magnitude of the output signal of the noise reduction unit 110 of 210 at the second threshold from a value obtained by multiplying the magnitude of the output signal of the noise reduction unit 110 or 210 by 2. That is, signal distortion can be compensated for according to the following equation.

(Output signal of signal compensator)=[(output signal of noise reduction unit)−(output signal of noise reduction unit at second threshold)]*2+(output signal of noise reduction unit at second threshold)=[(output signal of noise reduction unit)*2−(output signal of noise reduction unit at second threshold)]

FIG. 3F is a graph illustrating the output signal of the signal compensator 120 or 220, according to an exemplary embodiment of the present invention. Referring to FIG. 3F, it can be observed that distortion of the output signal of the noise reduction unit 110 or 210 is compensated at an illuminance 360 that is lower than the first threshold or an illuminance 370 that is higher than the second threshold.

Figure 4:
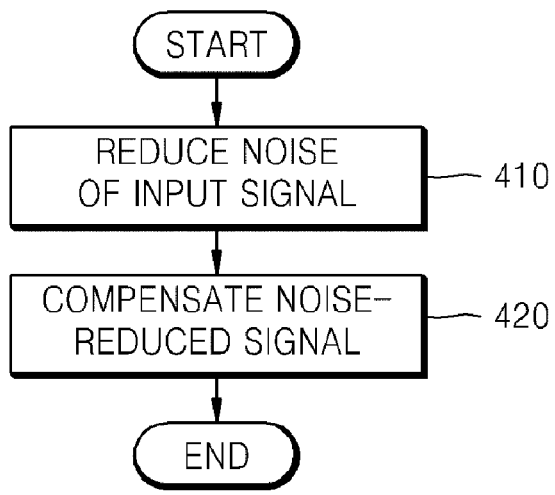
FIG. 4 is a flowchart illustrating a method of compensating signal distortion caused by noise, according to an exemplary embodiment of the present invention.

FIG. 4 is a flowchart illustrating a method of compensating signal distortion caused by noise, according to an exemplary embodiment of the present invention. Referring to FIG. 4, noise of an input signal including non-zero mean random noise is reduced in operation 410. The reduction of noise is performed in a spatial domain or a temporal domain. The input signal can be an output signal of an imaging device such as a CMOS image sensor or a CCD image sensor. The output signal of the imaging device can have a magnitude higher than 0V or lower than or equal to a maximum signal magnitude.

The noise-reduced signal is compensated in operation 420, and thus signal distortion caused by the non-zero mean random noise is removed. The method of compensating the noise-reduced signal has been explained with reference to FIGS. 1, 2 and 3.

Figure 5:
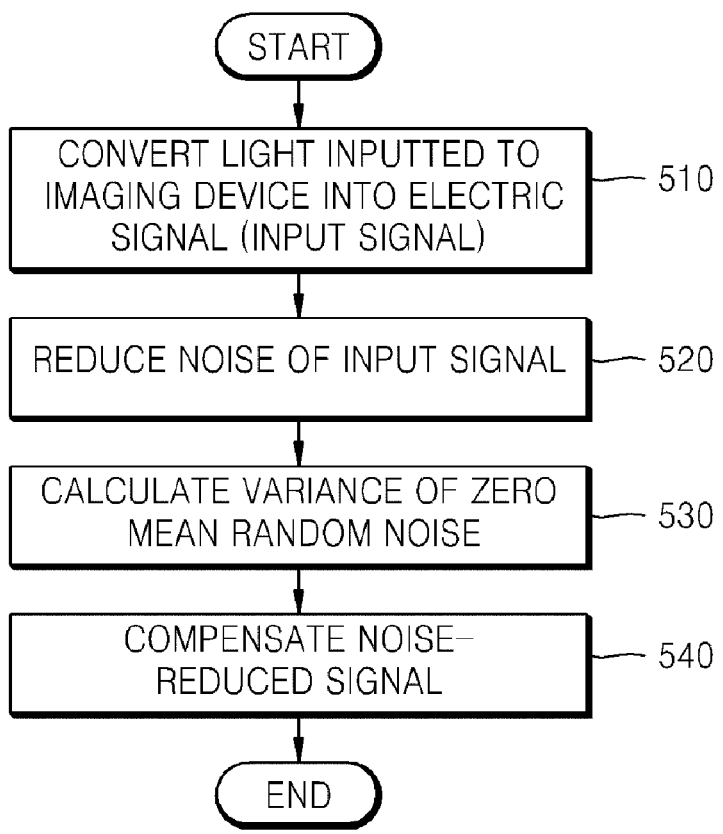
FIG. 5 is a flowchart illustrating a method of compensating signal distortion caused by noise, according to another exemplary embodiment of the present invention.

FIG. 5 is a flowchart illustrating a method of compensating signal distortion caused by noise, according to another exemplary embodiment of the present invention. Referring to FIG. 5, light input to an imaging device is converted into an electric signal in operation 5 10. The converted electric signal (that is, an input signal) may include non-zero mean random noise. Noise of the input signal including non-zero mean random noise is reduced in operation 520. The variance of zero mean random noise of the input signal is calculated in operation 530. In another exemplary embodiment of the present invention, operation 530 can be performed prior to operation 520. The noise-reduced signal is compensated in operation 540, and thus signal distortion caused by the non-zero mean random noise is removed.

Figure 6:
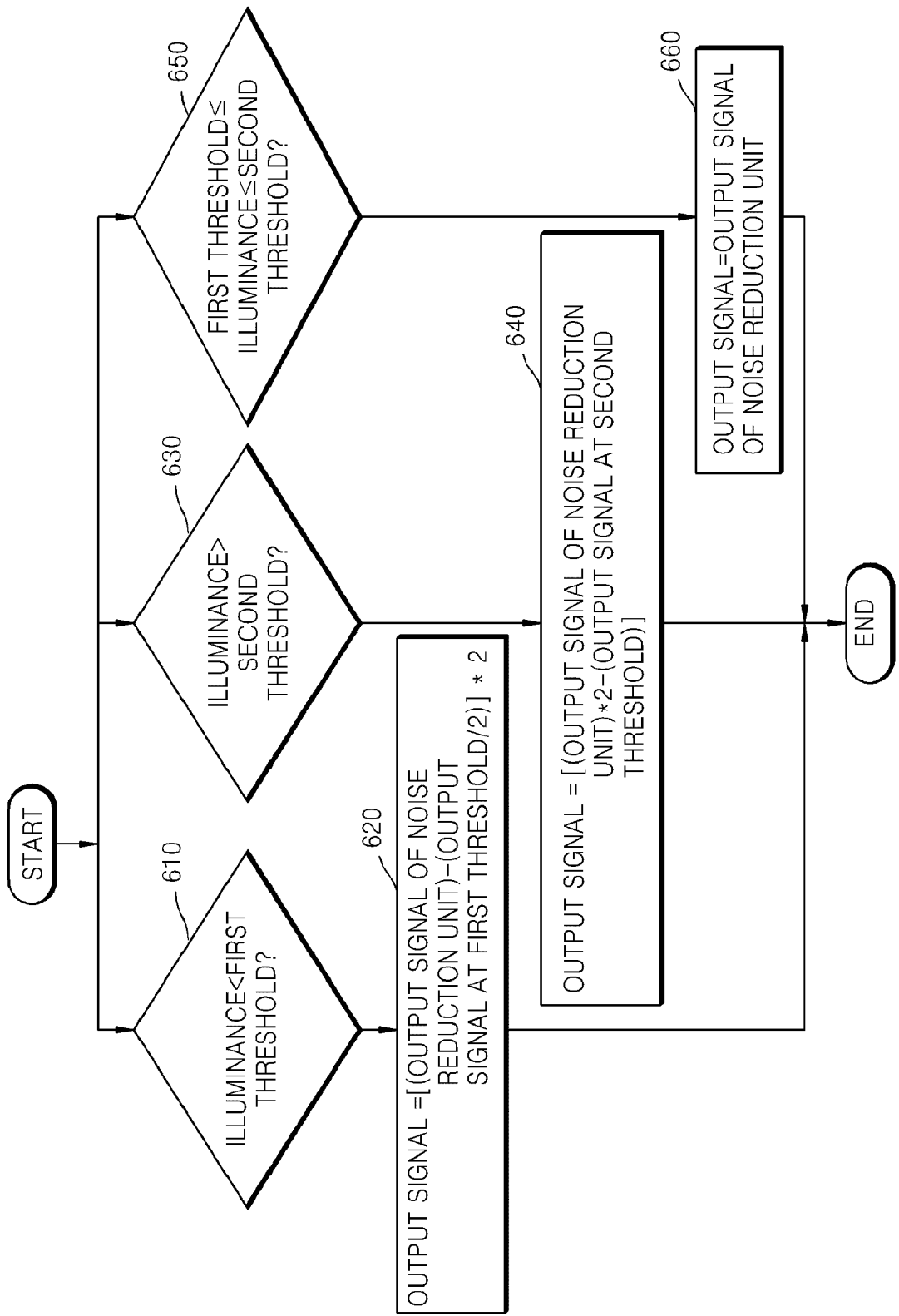
FIG. 6 is a flowchart illustrating an operation of compensating a noise-reduced signal in the method illustrated in FIG. 5, according to an exemplary embodiment of the present invention.
Figure 7:
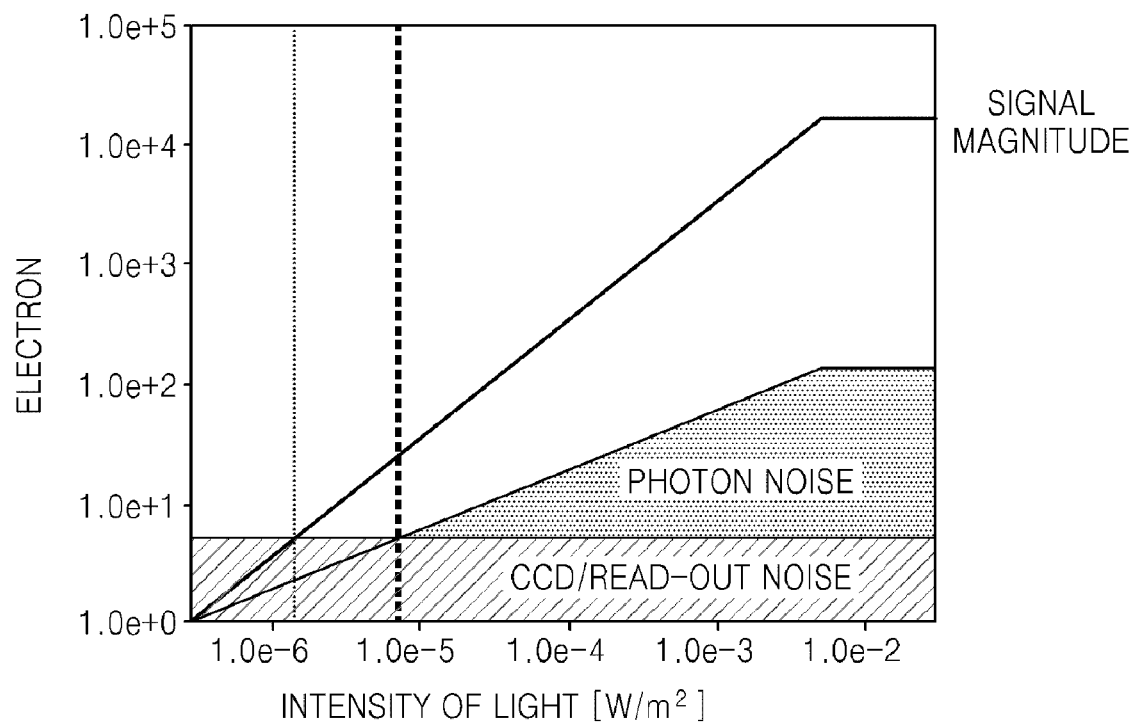
FIG. 7 is a graph for explaining noise generated according to the intensity of light input to an imaging device.

FIG. 6 is a flowchart illustrating the operation of compensating the noise-reduced signal in the method illustrated in FIG. 5, according to an exemplary embodiment of the present invention. Referring to FIG. 6, it is determined whether the illuminance of light input to the imaging device is lower than the first threshold in operation 610. The first threshold has been described with reference to FIGS. 3A-3F.

A value obtained by dividing the magnitude of the output signal at the first threshold by 2 is subtracted from the magnitude of the noise-reduced signal, and then the subtraction result is multiplied by 2 in operation 620. It is determined whether the illuminance of light input to the imaging device is higher than the second threshold in operation 630. The second threshold has been explained with reference to FIGS. 3A-3F. The magnitude of the output signal at the second threshold is subtracted from a value obtained by multiplying the magnitude of the noise-reduced signal by 2 in operation 640.

It is determined whether the illuminance of light input to the imaging device is higher than or equal to the first threshold and lower than or equal to the second threshold in operation 650. The noise-reduced signal is output without being compensated in operation 660.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for compensating signal distortion caused by noise, the apparatus comprising:
   a noise reduction unit which reduces noise of an input signal comprising zero mean random noise; and
   a signal compensator which compensates an output signal of the noise reduction unit which contains non-zero mean random noise left over after a noise reduction process performed by the noise reduction unit, the signal compensator compensates the output signal so that a signal distortion due to the non-zero mean random noise is removed from the output signal of the noise reduction unit, if illuminance of light input to the imaging device is lower than first threshold corresponding to an illuminance when a magnitude of the output signal of the noise reduction unit equals a standard deviation of the zero mean random noise, or if an illuminance of light input to the imaging device is higher than second threshold corresponding to an illuminance when if a magnitude of the output signal of the noise reduction unit equals a value obtained by subtracting a standard deviation of the zero mean random noise from a maximum signal magnitude, wherein the zero mean random noise is randomly distributed noise having a mean value of zero, and the non-zero mean random noise is randomly distributed noise having a mean value of which is not zero.

2. The apparatus of claim 1, wherein the input signal of the noise reduction unit corresponds to an output signal of an imaging device comprising a complementary metal oxide semiconductor image sensor or a charge coupled device image.

3. The apparatus of claim 1, wherein the signal compensator outputs a value obtained by subtracting a value, which is obtained by dividing the magnitude of the output signal of the noise reduction unit at the first threshold by 2, from the magnitude of the output signal of the noise reduction unit, and then multiplying the subtraction result by 2 if the illuminance corresponding to the output signal of the noise reduction unit is lower than the first threshold.

4. The apparatus of claim 1, wherein the signal compensator outputs a value obtained by subtracting the magnitude of the output signal of the noise reduction unit at the second threshold from a value obtained by multiplying the magnitude of the output signal of the noise reduction unit by 2 if the illuminance corresponding to the output signal of the noise reduction unit is higher than the second threshold.

5. The apparatus of claim 1, wherein the signal compensator outputs the output signal of the noise reduction unit without compensating the output signal of the noise reduction unit if the illuminance corresponding to the output signal of the noise reduction unit is higher than the first threshold.

6. The apparatus of claim 1, wherein the signal compensator outputs the output signal of the noise reduction unit without compensating the output signal of the noise reduction unit if the illuminance corresponding to the output signal of the noise reduction unit is lower than the second threshold.

7. The apparatus of claim 1, further comprising a noise variance calculator which calculates a variance of the zero mean random noise of the input signal and provides the variance to the signal compensator.

8. A method of compensating signal distortion caused by noise, the method comprising:

reducing noise of an input signal comprising zero mean random noise; and compensating the noise-reduced input signal, which contains non-zero mean random noise left over after the noise reduction, so that a signal distortion due to the non-zero mean random noise is removed from the noise-reduced signal, if an illuminance of light input to an imaging device is lower than first threshold corresponding to an illuminance when a magnitude of the noise-reduced input signal equals a standard deviation of the zero mean random noise, or if an illuminance of light input to the imaging device is higher than second threshold corresponding to illuminance when a magnitude of the noise-reduced input signal equals a value obtained by subtracting a standard deviation of the zero mean random noise from a maximum signal magnitude, wherein the zero mean random noise is randomly distributed noise having a mean value of zero, and the non-zero mean random noise is randomly distributed noise having a mean value of which is not zero.

9. The method of claim 8, wherein the input signal corresponds to an output signal of an imaging device comprising a complementary metal oxide image sensor or a charge coupled device image sensor.

10. The method of claim 8, wherein the compensating the noise-reduced signal comprises subtracting a value, which is obtained by dividing the magnitude of the noise-reduced input signal at the first threshold by 2, from the magnitude of the noise-reduced input signal, and then multiplying the subtraction result by 2 when the illuminance corresponding to the noise-reduced input signal is lower than the first threshold.

11. The method of claim 8, wherein the compensating the noise-reduced signal comprises subtracting the magnitude of the noise-reduced input signal at the second threshold from a value obtained by multiplying the magnitude of the noise-reduced input signal by 2 if the illuminance corresponding to the output signal of the noise reduction unit is higher than the second threshold.

12. The method of claim 8, wherein the compensating the noise-reduced signal comprises outputting the output signal of the noise reduction unit without compensating the noise-reduced input signal if the illuminance corresponding to the noise-reduced input signal is higher than the first threshold.

13. The method of claim 8, wherein the compensating the noise-reduced signal comprises outputting the noise-reduced input signal without compensating the noise-reduced input signal if the illuminance corresponding to the noise-reduced input signal is lower than the second threshold.

14. The method of claim 8, further comprising calculating a variance of the zero mean random noise of the input signal before the compensating the noise-reduced signal.

15. A computer readable recording medium storing a program for executing a method for compensating signal distortion caused by a noise, the method comprising:

reducing noise of an input signal comprising zero mean random noise; and compensating the noise-reduced input signal, which contains non-zero mean random noise left over after the noise reduction, so that a signal distortion due to the non-zero mean random noise is removed from the noise-reduced signal, if an illuminance of light input to an imaging device is lower than first threshold corresponding to an illuminance when a magnitude of the noise-reduced input signal equals a standard deviation of the zero mean random noise, or if an illuminance of light input to the imaging device is higher than second threshold corresponding to illuminance when a magnitude of the noise-reduced input signal equals a value obtained by subtracting a standard deviation of the zero mean random noise from a maximum signal magnitude, wherein the zero mean random noise is randomly distributed noise having a mean value of zero, and the non-zero mean random noise is randomly distributed noise having a mean value of which is not zero.

* * * * *